US010887357B2

(12) United States Patent
Hardee et al.

(10) Patent No.: US 10,887,357 B2
(45) Date of Patent: Jan. 5, 2021

(54) DOCUMENT COLLABORATION TOOL

(71) Applicant: International Business Machines Corporation, Armonk, NY (US)

(72) Inventors: Christopher J. Hardee, Raleigh, NC (US); Steven Joroff, River Vale, NJ (US); Pamela A. Nesbitt, Ridgefield, CT (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/108,193

(22) Filed: Aug. 22, 2018

(65) Prior Publication Data

US 2020/0067997 A1 Feb. 27, 2020

(51) Int. Cl.
| | | |
|---|---|---|
| *G06F 3/048* | (2013.01) | |
| *H04L 29/06* | (2006.01) | |
| *H04L 29/08* | (2006.01) | |
| *G06F 40/166* | (2020.01) | |
| *G06Q 10/10* | (2012.01) | |
| *G06F 21/62* | (2013.01) | |

(52) U.S. Cl.
CPC ...... *H04L 65/4015* (2013.01); *G06F 21/6209* (2013.01); *G06F 40/166* (2020.01); *G06Q 10/101* (2013.01); *H04L 67/22* (2013.01)

(58) Field of Classification Search
CPC ..... H04L 65/4015; H04L 67/22; G06F 17/24; G06F 40/166; G06F 21/6209; G06Q 10/101
USPC ........................................................ 715/751
See application file for complete search history.

(56) References Cited

U.S. PATENT DOCUMENTS

| | | | | |
|---|---|---|---|---|
| 7,457,880 | B1* | 11/2008 | Kim ..................... | G06F 3/0619 |
| | | | | 709/229 |
| 7,603,357 | B1* | 10/2009 | Gourdol ............. | G06F 16/1774 |
| 9,710,442 | B1* | 7/2017 | Siegel ................. | G06F 17/2247 |
| 10,126,927 | B1* | 11/2018 | Fieldman ............. | G06Q 10/107 |
| 2005/0289512 | A1* | 12/2005 | Matsusaka ............. | G06F 9/526 |
| | | | | 717/120 |
| 2009/0055799 | A1* | 2/2009 | Cao .......................... | G06F 8/71 |
| | | | | 717/111 |
| 2010/0174783 | A1* | 7/2010 | Zarom .................... | G06F 9/526 |
| | | | | 709/205 |
| 2012/0047434 | A1 | 2/2012 | Ginetti | |

(Continued)

OTHER PUBLICATIONS

Mell et al., "The NIST Definition of Cloud Computing", Recommendations of the National Institute of Standards and Technology, Sep. 2011, 7 pages.

*Primary Examiner* — Renee D Chavez
*Assistant Examiner* — Jianmei F Duckworth
(74) *Attorney, Agent, or Firm* — James L. Olsen (57) ABSTRACT

Aspects of the present disclosure relate to managing a collaborated environment. A set of editing rules are configured for a shared document. A first edit is received at a first time at a first location of the shared document. A second edit is received at a second time at the first location of the shared document which attempts to overwrite a portion of the first edit. A determination is made whether at least one editing rule of the set of editing rules is violated. In response to determining that at least one editing rule of the set of editing rules is violated, an alert action can be issued to a user associated with the second edit.

6 Claims, 7 Drawing Sheets

(56) References Cited

U.S. PATENT DOCUMENTS

| | | | |
|---|---|---|---|
| 2013/0275401 A1* | 10/2013 | Auger | G06F 21/10 707/704 |
| 2014/0289645 A1 | 9/2014 | Megiddo et al. | |
| 2015/0067467 A1 | 3/2015 | Bailor et al. | |
| 2016/0048486 A1 | 2/2016 | Lopategui | |

* cited by examiner

DOCUMENT COLLABORATION TOOL

BACKGROUND

The present disclosure relates generally to the field of documentation, and more particularly to document collaboration.

Collaborated documents allow multiple users to access and edit the same document simultaneously. Users can co-author the same document remotely over a network. The edits made by one user can be visible to another user in real time. This can prevent users from entering conflicting or redundant edits into a shared document.

SUMMARY

Embodiments of the present disclosure relate to a method, system, and computer program product for managing a collaborated environment. A set of editing rules can be configured for a shared document. A first edit can be received at a first time at a first location of the shared document. A second edit can be received at a second time at the first location of the shared document which attempts to overwrite a portion of the first edit. A determination can be made whether at least one editing rule of the set of editing rules is violated. In response to determining that at least one editing rule of the set of editing rules is violated, an alert action can be issued to a user associated with the second edit.

In embodiments, a first edit from a first user at a first location of a shared document can be received at a first time. The first edit can be marked-up at the first location. An age of the first edit at a second time can be determined. The age of the first edit at the second time can be compared to an age threshold. A determination can be made, in response to the age of the first edit at the second time being within the age threshold, that the first edit should remain marked-up. A second edit can then be received at the second time which attempts to overwrite a portion of the first edit at the first location. A determination can be made whether the second edit was received by the first user. In response to a determination that the second edit was not received by the first user, an alert action can be issued to a second user associated with the second edit.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of documentation, and in particular to document collaboration. While the present disclosure is not necessarily limited to such applications, various aspects of the disclosure may be appreciated through a discussion of various examples using this context.

Collaboration tools can be configured to indicate where one or more users who are accessing a shared document are currently editing. If each user is cognizant of these indications, conflicts can be avoided. However, complications arise when users overwrite recent edits made by other users. These situations can occur as a result of subsequent editing users not being aware of preceding edits made by other users (e.g., the subsequent editing user was away from keyboard, the subsequent editing user was busy with his or her own work at the time, the subsequent editing user was not a member of the shared document at the time, etc.). The recent changes made by preceding editing users, though visible to users currently accessing the document, may not be indicated as recent changes. Further, users currently accessing the document may not be aware of the user who made the change (e.g., the previous user was the owner of the shared document, a project lead, a manager, etc.). Accordingly, the subsequent editing user may undesirably overwrite the changes entered by the preceding editing user inadvertently. This can impede editing efficiency, lead to document conflicts or redundancies, and lead to recent data being overwritten undesirably.

Aspects of the present disclosure address the aforementioned complications by managing the edits within the collaborative environment. The collaborative environment can be managed in a variety of manners. In some embodiments, editing rules can be configured to dictate whether edit overwrites are permitted and/or whether notifications are prompted to users attempting to overwrite edits. The editing rules can be based on the age of the edits (e.g., the amount of time since an edit was entered), users (e.g., user roles, user privilege levels, user names) who entered the edits, version history (e.g., which version edits were committed), etc. If any editing rules are violated (e.g., an edit was entered too recently to be overwritten) alert actions can be issued. For example, subsequent edits can be prohibited and/or notifications can be triggered warning subsequent editing users of overwrites. The notifications can include information regarding users who entered preceding edits, the age of edits at the time of overwrite, and editing rules which were violated.

In some embodiments, edits in a collaborative environment can be managed using mark-ups (e.g., colors, symbols, textures, etc.). Edits can be marked-up based on the age of the edits, users who entered the edits, and/or version history. Marking-up the edits based on the recency of the edits, the users who entered the edits, and/or the version history can provide information to subsequent editing users to aid their decision when overwriting data in a collaborative environment. In some embodiments, based on the mark-up status (e.g., the color of the edits), alert actions can be issued. For example, edits can be prohibited, mark-up status can be altered, and/or notifications can be triggered to warn subsequent editing users of overwrites.

As used herein, the term "edit" is understood to mean changes to a document such as added characters, deleted characters, changes in capitalization, changes in font, changes in color, changes in size, changes in punctuation, and/or other changes to one or more alphanumeric characters (e.g., including spaces) in a word processing document. Furthermore, in some embodiments, edits can refer to changes in layout including changes in margins, orientation, paper size, spacing, indentations, and so on.

Figure 1:
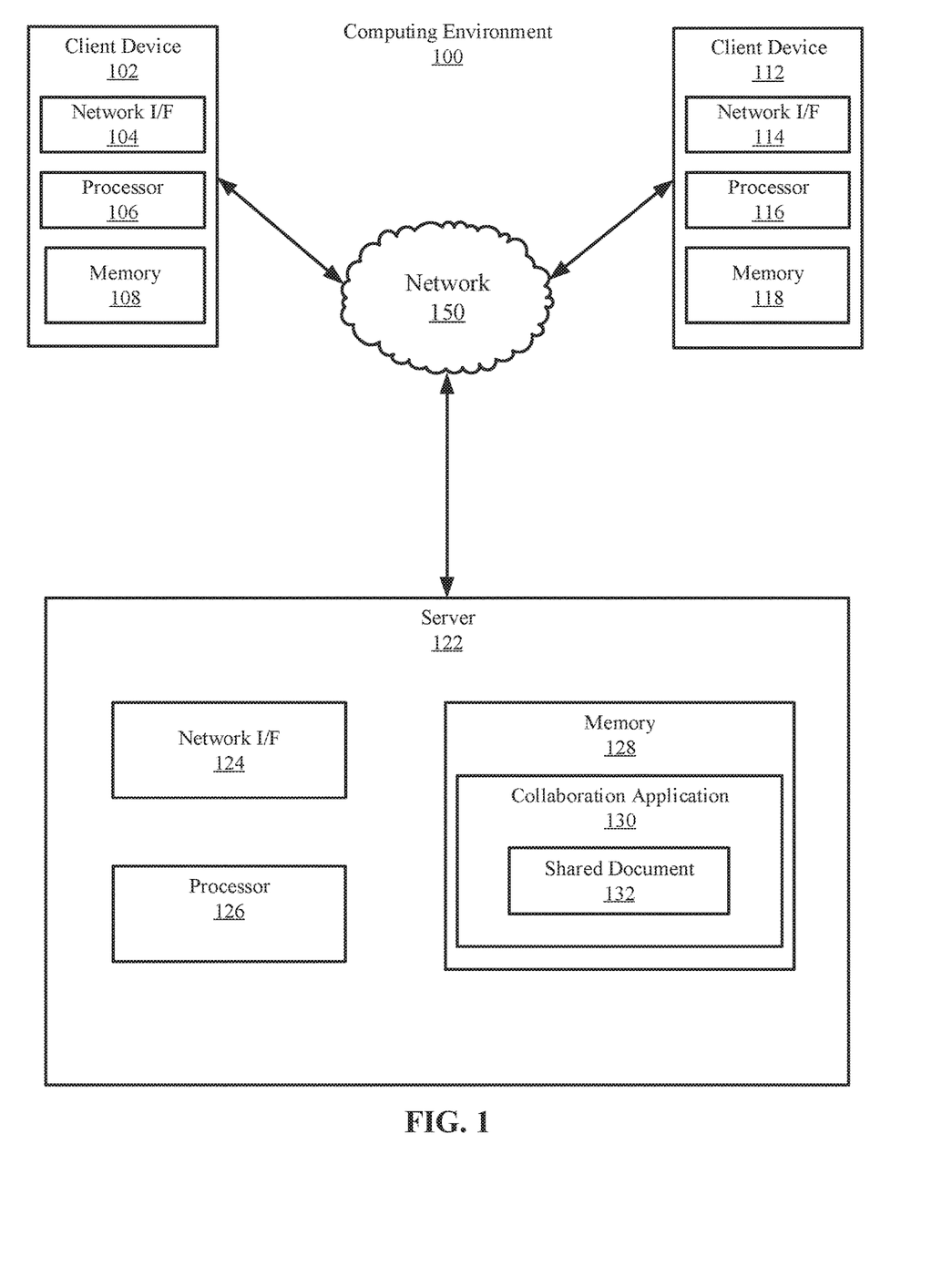
FIG. 1 depicts a block diagram of an example computing environment in which illustrative embodiments of the present disclosure may be implemented.

Turning now to the figures, FIG. 1 depicts a block diagram of an example computing environment 100 in which illustrative embodiments of the present disclosure can be implemented. In some embodiments, the computing environment 100 can include two client devices 102 and 112 and a server 122.

Consistent with various embodiments, the server 122 and the client devices 102 and 112 are computer systems. The client devices 102 and 112 and the server 122 include one or more processors 106, 116, and 126 and one or more memories 108, 118, and 128, respectively. The client devices 102 and 112 and the server 122 can be configured to communicate with each other through an internal or external network interface 104, 114, and 124. The network interfaces 104, 114, and 124 can be, in some embodiments, modems or network interface cards. The client devices 102 and 112 and/or the server 122 can be equipped with a display or monitor. Additionally, the client devices 102 and 112 and/or the server 122 can include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). The client devices 102 and 112 and/or the server 122 can be servers, desktops, laptops, or hand-held devices.

The client devices 102 and 112 and the server 122 can be distant from each other and communicate over a network 150. In some embodiments, the server 122 may be a central hub from which client devices 102 and 112 can establish a communication connection, such as in a client-server networking model. Alternatively, the server 112 and client devices 102 and 112 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the client devices 102 and 112 and the server 122 can be local to each other, and communicate via any appropriate local communication medium. For example, the client devices 102 and 112 and the server 122 may communicate using a local area network (LAN), one or more hardwire connections, a wireless link or router, or an intranet. In some embodiments, the client devices 102 and 112 and the server 122 can be communicatively coupled using a combination of one or more networks and/or one or more local connections. For example, the first client device 102 can be hardwired to the server 122 (e.g., connected with an Ethernet cable) while the second client device 112 can communicate with the server using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

As depicted in FIG. 1, a collaboration application 130 is stored in the memory 128 of the server. The collaboration application 130 can be dispatched over the network 150 to each client 102 and 112 such that the clients 102 and 112 can edit (e.g., write data to) a shared document 132 of the collaboration application 130. The client 102 and the client 112 can access the shared document 132 simultaneously, and update the shared document 132 in real time (e.g., based on the latency/speed of communication with the server 122). This allows edits made by each client 102 and 112 to be visible to one another.

The shared document 132 can be any suitable document or file. For example, the shared document 132 can be a text document (e.g., a contract, a report, an essay, a financial statement, etc.), a presentation, a spreadsheet, source code, an email, etc.

The collaboration application 130 can include a variety of features. In embodiments, the collaboration application 130 can display usernames associated with users accessing the shared document 132 (e.g., which can be associated with respective client devices). In embodiments, pointers or cursors associated with users can be visible to each other user. In some embodiments, each user can be assigned a particular color. In these embodiments, locations (e.g., fields, lines, columns, etc.) each respective user is editing can be highlighted based on their assigned color. Further, pointers or cursors associated with each user can be displayed based on their assigned color. In some embodiments, version history logs can be maintained by the collaboration application 130 for the shared document 132. This can enable users accessing the shared document 132 to view the state of the shared document 132 at particular times, as well as the change history. The collaboration application 130 can also include a chat component. The chat component can allow users accessing the shared document 132 to instant message (IM) each other regarding updates to be made to the shared document 132.

The collaboration application 130 can be configured to save update data. The update data can include edits (e.g., writes) committed at particular times by particular users. This can allow the collaboration application 130 to identify when particular updates were made by particular users.

The collaboration application 130 can utilize the update data to facilitate future document edits. For example, the collaboration application 130 can be configured to allow/block updates based on changes made within a predetermined time period. Alternatively, the collaboration application 130 can be configured to commit/rescind updates based on the time the updates were made and/or the users that submitted the updates. As another example, the collaboration application 130 can be configured to present warnings to users attempting to edit recently updated content on the shared document 132. In some embodiments, the collaboration application 130 can be configured to mark-up edits (e.g., using colors, symbols, textures, etc.) to indicate recently edited content.

While FIG. 1 illustrates a computing environment 100 with a single server 122 and two client devices 102 and 112, suitable computing environments for implementing embodiments of this disclosure can include any number of client devices and servers. The various models, modules, systems, and components illustrated in FIG. 1 may exist, if at all, across a plurality of servers and client devices. For example, some embodiments may include two servers. The two servers may be communicatively coupled using any suitable communications connection (e.g., using a WAN, a LAN, a wired connection, an intranet, or the Internet).

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
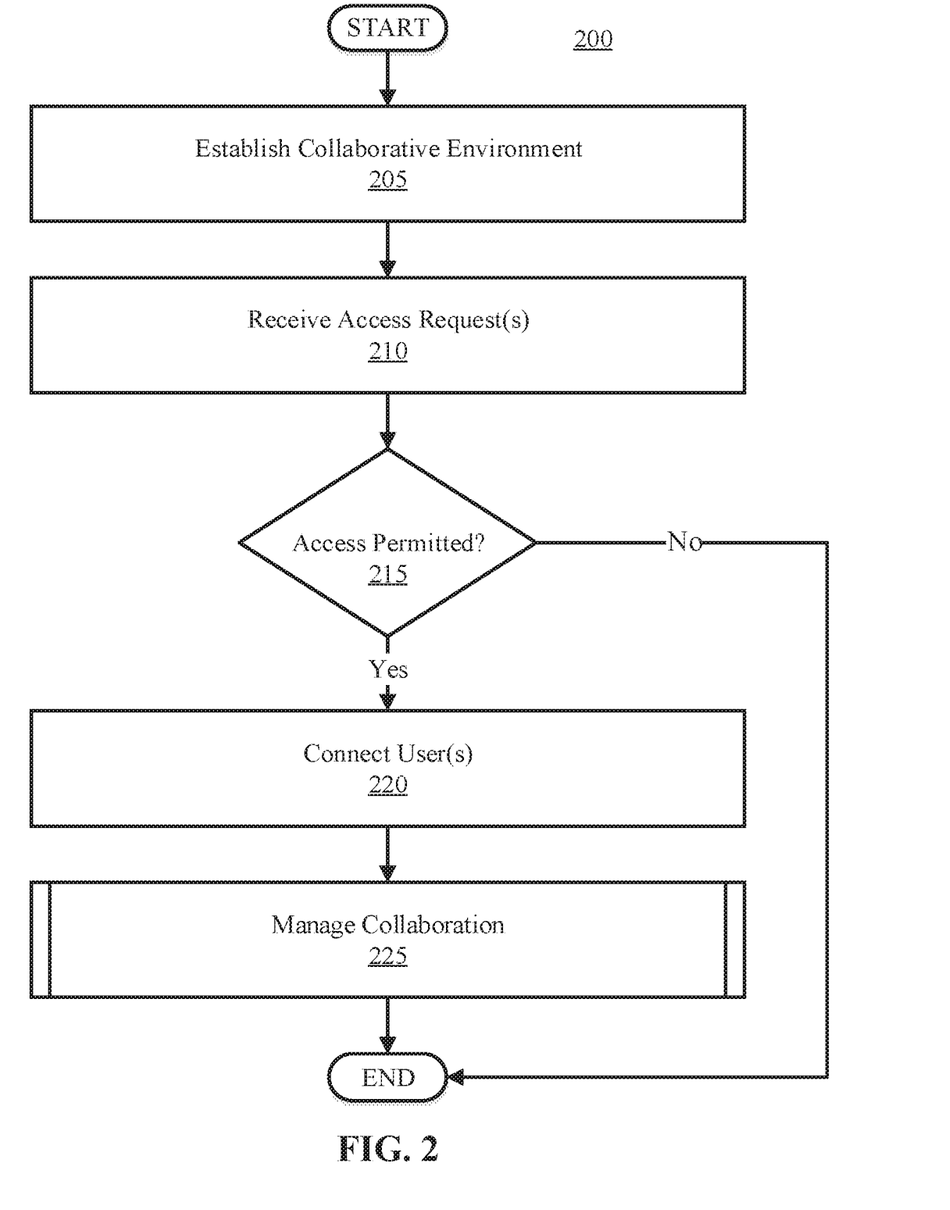
FIG. 2 depicts a flow-diagram illustrating a process of establishing a collaborative environment, in accordance with embodiments of the present disclosure.

FIG. 2 is a flow diagram illustrating an example process 200 for initiating a collaborative environment, in accordance with embodiments of the present disclosure.

The process 200 initiates when a collaborative environment is established. This is illustrated at step 205. The collaborative environment can be established by deploying a collaboration application onto the internet. The collaboration application can be the same as, or substantially similar to, the collaboration application 130 described in FIG. 1. In embodiments, the collaboration application can include shared folders, files, documents (e.g., shared document 132 of FIG. 1), and the like.

Access request(s) are then received by one or more users. This is illustrated at step 210. In some embodiments, users can request access to the shared document via a website (e.g., a universal resource locator (URL) or domain name) associated with the shared document. In embodiments, users can request access through an application associated with the shared document.

In some embodiments, access requests can be received in response to invitations. For example, an administrator or moderator of the shared document can transmit invitation data (e.g., a URL, log-in credentials, etc.) to one or more users in order to connect the users to the shared document.

A determination is then made whether the users(s) who requested access are permitted to access the shared document. This is illustrated at step 215. In some embodiments, the determination whether users have access to the shared document can be completed based on user authentication. User authentication protocols can include passwords, mobile (cellular) authentication, biometric authentication (e.g., fingerprints, facial recognition, etc.), email authentication, etc. In embodiments, multiple authentication protocols can be applied simultaneously (e.g., two-factor or three-factor authentication). In some embodiments, determining whether user(s) who requested access are permitted to access the shared document can be completed by comparing requesting users to a whitelist. Any users who requested access that appear on the whitelist can be permitted to access the shared document. Alternatively, in some embodiments, the determination can be made by comparing user access requests to a blacklist. In these embodiments, any user who does not appear on the blacklist can be permitted to access the shared document. In some embodiments, there may not be an authentication protocol, and any user who requested access (e.g., by entering a shared document URL) to the shared document can receive access. In some embodiments, authentication may only be necessary to edit the shared document (as opposed to viewing the shared document).

If a determination is made that the user(s) do not have access to the shared document, then process 200 ends, and the user(s) are prevented from accessing the shared document. If a determination is made that the user(s) do have access to the shared document, then the user(s) are connected to the shared document. This is illustrated at step 220. The connected user(s) can then write data to the shared document.

Collaboration between the users connected to the shared document is then managed. This is illustrated at step 225. Managing the collaboration between the users can prevent redundancy, loss of work, and/or altering content that was recently changed by another user. In collaboration environments, edits made by users simultaneously accessing the shared document can be visible in real time. If users are paying attention to other user's indicators (e.g., cursors, pointers, highlighted fields), altering recently edited content entered by another user can be avoided. However, if these edits are not apparent to a subsequent editing user, they can be overwritten shortly after the edits are made. Accordingly, managing the collaboration between users accessing the shared document can prevent situations where recently entered edits are overwritten inadvertently.

The collaboration between users can be managed in a variety of manners. In some embodiments, the collaboration between users can be managed by setting one or more editing rules which dictate when particular edits are permitted in the shared document. The editing rules can dictate edit overwrite permission based on user privilege, user accounts, age of edits, and the like. Further detail regarding editing rules is discussed with reference to FIG. 3. In some embodiments, user edits can be marked-up based on colors, textures, symbols, etc. associated with each respective user. Based on mark-up status (e.g., whether an edit is colored according to a user), edits can be permitted or blocked. In some embodiments, notifications (e.g., warnings) can be transmitted to subsequent editing users attempting to alter recently edited content. Further detail regarding mark-up status to dictate edit permission is discussed with reference to FIG. 4.

In embodiments, based on editing rules and/or mark-up status, alert actions can be executed. Alert actions can include prompting warnings/notifications, altering document mark-ups (e.g., altering color (tone, shade, tint, etc.)), and/or blocking (e.g., preventing, preempting, intercepting, etc.) edits. Alert actions generally refer to actions made in the collaborative environment which deter (or resist) overwriting content based on one or more factors (e.g., edit age, authors who entered the content, version history, etc.). The alert actions can be issued to particular users, devices (e.g., mobile devices, laptops, desktop computers, servers, etc.), applications (e.g., a collaboration application), etc.

Figure 3:
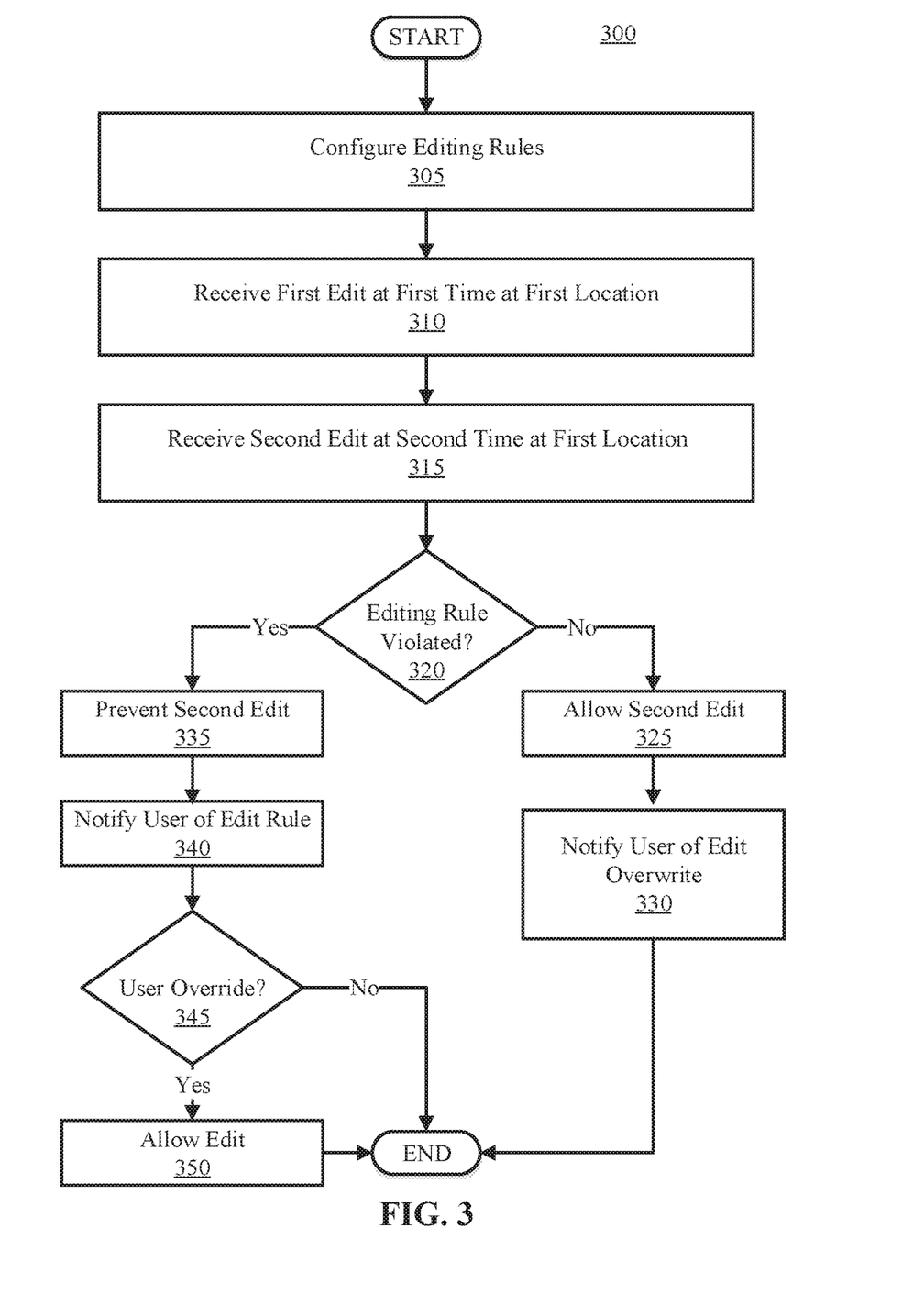
FIG. 3 depicts a flow-diagram illustrating a process of managing a collaborative environment according to editing rules, in accordance with embodiments of the present disclosure.

Referring now to FIG. 3, shown is a flow diagram illustrating a process 300 for managing a shared document according to editing rules, in accordance with embodiments of the present disclosure.

Process 300 initiates where editing rules are configured. This is illustrated at step 305. The editing rules can dictate whether preceding edits are permitted to be overwritten by subsequent edits based on certain criteria (e.g., the time since an edit was entered, the user who entered the edit, etc.). Further, the editing rules can dictate whether notifications and/or warnings are to be transmitted to users attempting to overwrite content.

The editing rules can be configured by a moderator or administrator of a shared document. In some embodiments, templates having pre-configured editing rules can be selected by a moderator or administrator. In some embodiments, a moderator or administrator can manually set editing rules (e.g., via a graphical user interface (GUI)). In embodiments, certain sets of editing rules can be applied to certain users (e.g., different users may be governed by different editing rules). In some embodiments, editing rules can be set for individual edits (e.g., different edits can be governed by different editing rules).

In embodiments, editing rules can specify whether preceding edits are permitted to be overwritten by subsequent edits based on an age of the preceding edit (e.g., the time period since the preceding edit was entered). For example, assume the editing rules specify that an edit with up to a 10 minute age (e.g., the edit was made 10 minutes ago) cannot be overwritten. In this example, if a subsequent editing user attempts to overwrite the edit with an age of 5 minutes, then the subsequent edit will not be permitted (e.g., as it does not exceed the 10-minute age threshold). The age at which a preceding edit is permitted to be overwritten can be any suitable age (e.g., 30 seconds, 5 minutes, 10 minutes, 30 minutes, one day, etc.). Permitting/prohibiting edit overwrites based on age prevents recent edits from being deleted/altered inadvertently.

Similarly, the editing rules can specify whether notifications (e.g., warnings) are prompted to subsequent editing users based on the age of preceding edits. In these embodiments, as opposed to, or in addition to permitting/prohibiting edit overwrites based on age, notifications can be prompted to subsequent editors based on age. The notifications can include update data such as the age of the preceding edit, the user who entered the edit, the role of the user who entered the edit (e.g., project manager, engineer, quality control, etc.), the privilege level (e.g., owner, co-owner, editor, etc.) of the user who entered the edit, the version of the document in which the edit was entered, etc. Transmitting notifications rather than prohibiting overwrites can allow subsequent editing users to determine whether overwrites are justified (e.g., to fix a typo, to update data, etc.). Further, providing update data (e.g., age, user role, user privilege level, etc.) to subsequent editing users aids their decision in determining whether to commit an overwrite. For example, a user with a role "engineer" may not desire to overwrite a user with the role "project manager." Similarly, a user with the privilege level "editor" may not desire to overwrite a user with the privilege level "owner" or "admin."

In embodiments, the age at which a preceding edit can be overwritten as specified in the editing rules (e.g., or the age at which notifications are displayed) can be based on user names, user roles, and/or user privilege levels. For example, the editing rules can specify a first age (e.g., one day) at/after which users having a first user role (e.g., project manager) can have their edits overwritten and a second age (e.g., one hour) at/after which users having a second user role (e.g., engineer) can have their edits overwritten. Similarly, the editing rules can specify a first age (e.g., 30 minutes) at/after which users having a first privilege level (e.g., owner) can have their edits overwritten and a second age (e.g., 10 minutes) at/after which users having a second privilege level (e.g., editor) can have their edits overwritten.

In some embodiments, the editing rules can specify that permitting/prohibiting overwrites can be completed in combination with prompting notifications. In these embodiments, upon permitting or prohibiting edit overwrites, notifications can be prompted to subsequent editing users to inform the subsequent editing users why their edits were prohibited or permitted. In some embodiments, the age at which edits are permitted/prohibited and the age at which notifications are prompted may differ. For example, the editing rules can specify that edit overwrites are permitted at/after a first edit age, and that notifications are prompted up until a second edit age, the second edit age being greater than the first edit age. Following the example, a user edit may be permitted to be overwritten at/after an age of 10 minutes, and a notification may be prompted to a user attempting to overwrite the edit until an age of 20 minutes.

In some embodiments, editing rules can be based solely on user names, user roles, and/or user privilege levels. For example, the editing rules can specify that edits made by a first user role (e.g., project lead) cannot be overwritten under any circumstance. Similarly, the editing rules can specify that edits made by a user having a first user privilege level (e.g., shared document admin) cannot be overwritten under any circumstance. In some embodiments, user roles, user privileges, and/or user names can be hierarchically organized. In these embodiments, overwrite permission may only be granted if a user is either ranked above another user or on the same hierarchical standing as another user. For example, assume three user privilege levels: owner, admin, and editor. In this example, the editing rules can specify that a user with the privilege level "owner" can overwrite edits made by users having any of the three privilege levels, a user with the privilege level "admin" can only overwrite edits made by users having the privilege levels "admin" or "editor," and a user with the privilege level "editor" can only overwrite edits made by users having the privilege level "editor."

In some embodiments, the editing rules specify overwrite permission and/or notification prompting based on version history. For example, the editing rules can specify that a first edit entered in a first document version is uneditable, a second edit entered in a second document version prompts a warning when an overwrite of the second edit is attempted, and a third edit entered in a third document version is editable. Any number of editing rules can be implemented across various versions of a shared document.

Upon configuring the editing rules, a first edit is received at a first time at a first location. This is illustrated at step 310. The location the first edit is received depends on the type of shared document. For example, if the shared document is a spreadsheet, the location may be a cell in which the edit was entered. Alternatively, for a text document, the location may be a word, line, paragraph, page, or section which was edited. For a source code file, the location may be a line or block of code. However, the location can vary, and merely refers to the portion of the shared document (or file) that was edited. The first edit can then be entered at the first location at the first time.

A second edit is received at a second time at the first location which overwrites a portion (e.g., an alphanumeric character) of the first edit. This is illustrated at step 315. Because the second edit attempts to overwrite a portion of the first edit, a determination is made whether an editing rule is violated. This is illustrated at step 320. The determination whether an editing rule is violated is completed by referencing the editing rules specified at step 305. For example, if the editing rules specify that edits cannot be overwritten until an age of 20 minutes, if a second edit is received while the first edit has an age of 15 minutes, a determination is made that an editing rule is violated. As another example, assume that an editing rule specifies that a user with a privilege level "editor" cannot overwrite an edit by a user with a privilege level "owner." In this example, if the first edit was made by an "owner" and the second edit was transmitted by an "editor," then a determination can be made that an editing rule is violated.

If a determination is made that no editing rules are violated, then process 300 proceeds to step 325, where the second edit is allowed. Allowing the second edit enables the second edit to overwrite the at least one portion of the first edit. The user who entered the second edit which overwrote the first edit is then notified of the overwrite. This is illustrated at step 330. The notification can include update data such as the age of the first edit, the user who entered the first edit, the user-role of the user who entered the first edit, the user privilege level of the user who entered the first edit, the version of the shared document the first edit was updated to, etc. The notification may also provide the user who entered the second edit a chance to revert the second edit based on the notification data. This can be beneficial if the second user determines that, upon learning the context of the first edit, the second edit should not be entered.

If an editing rule is violated at step 320, then the second edit is prevented. This is illustrated at step 335. The second edit is not entered (e.g., temporarily or permanently), and the user who transmitted the second edit is notified of the violated edit rule. This is illustrated at step 340. For example, assume that an age threshold to permit edit overwrites is defined as 20 minutes. In this example, a user who entered a subsequent edit within the 20 minute window can be notified that their edit is not permitted for the next "X" minutes, where "X" is the remaining time period until the age of the edit is 20 minutes (if the user transmitted the second edit when the first edit had an age of 15 minutes, then "X" would be 5 minutes). The notification at step 340 can also include the update data specified at step 330 (e.g., the user who entered the first edit, the age of the first edit, etc.).

A determination is then made whether a user override is requested. This is illustrated at step 345. The user who attempted to enter the second edit (e.g., or another user) may desire to override the edit prevention at step 335. Accordingly, the user may specify to enter the edit regardless of the violated edit rule. If a determination is made that a user override is requested, then the second edit entered at the second time is allowed. This is illustrated at step 350. If a determination is made that the user override is not requested, then process 300 ends. By prohibiting certain edits based on a set of editing rules, overwriting recently entered updates inadvertently can be avoided. Further, by prompting notifications to users including update data and violated editing rules, users attempting to alter recently edited data can be aware of the context of the preceding edit to determine whether an overwrite is justified.

Figure 4:
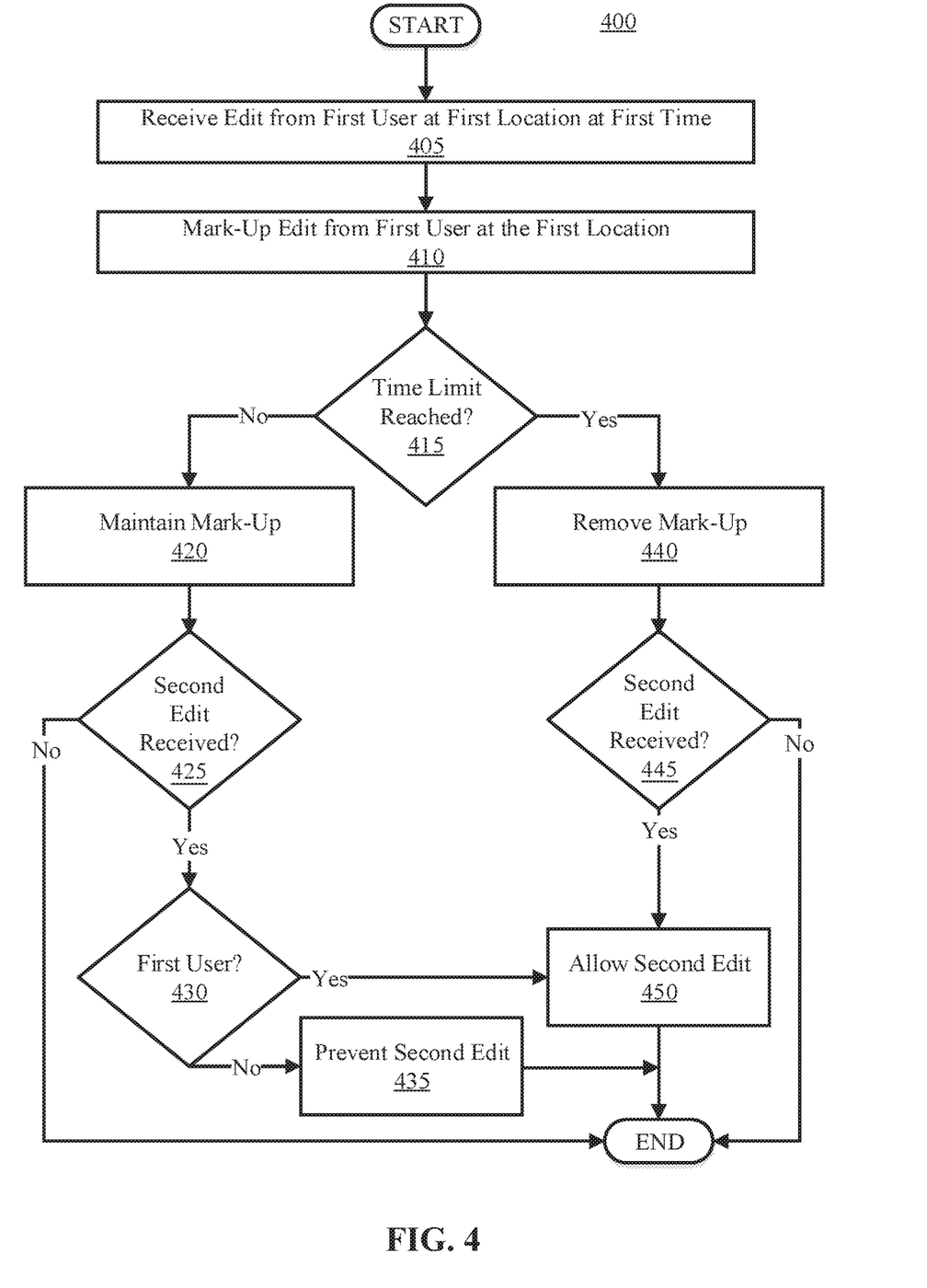
FIG. 4 depicts a flow-diagram illustrating a process of managing a collaborative environment using mark-ups, in accordance with embodiments of the present disclosure.

Referring now to FIG. 4, shown is a flow-diagram illustrating a process 400 for managing collaboration of a shared document using mark-ups, in accordance with embodiments of the present disclosure.

Process 400 initiates where a first edit is received from a first user at a first location. This is illustrated at step 405. The first edit is then marked-up at the first location. This is illustrated at step 410. The first edit can be marked-up in any suitable manner. In embodiments, edits can be marked-up using colors (e.g., a color corresponding to a user). In these embodiments, the text of the edits can be marked-up and/or the location (e.g., the cell, the line, the page, etc.) of the edits can be marked up. For example, if an edit is entered into a spreadsheet, the cell(s) the edit was entered into can be filled or outlined with a particular color. In some embodiments, the mark-up can include symbols (e.g., a star, a circle, a triangle, an animal, etc.), characters, textures, etc.

Marked-up edits can be used to notify subsequent editing users of recent changes. Accordingly, based on the mark-up status (e.g., the color of the edit, symbols near the edit, etc.), subsequent editing users can make informed decisions when overwriting edits.

A determination is then made whether a time limit is reached. This is illustrated at step 415. The time limit dictates whether the mark-up should be maintained or removed. Any suitable time-limit can be implemented (e.g., 1 minute, 5 minutes, 1 hour, 1 day, etc.). If the time limit is not reached, then the mark-up is maintained. This is illustrated at step 420. A determination is then made whether a second edit is received which overwrites a portion of the first edit. This is illustrated at step 425. If a second edit is not received, then process 400 ends, and the mark-up is maintained until the time limit is reached.

If a second edit is received, then a determination is made whether the second edit was received from the first user. This is illustrated at step 430. If the second edit was entered by the first user, then the user is overwriting his or her own work. Accordingly, the second edit is allowed if it is transmitted by the first user. This is illustrated at step 450. If the second edit was entered by another user, then the second edit is prevented. This is illustrated at step 435. The second edit can be prevented by another user as it attempts to overwrite recently entered content.

If a determination is made that the time limit is reached at step 415, then the mark-up is removed (e.g., reverted to the original color, the symbol is removed, etc.). This is illustrated at step 440. A determination is then made whether a second edit is received. This is illustrated at step 445. If a second edit is received, the second edit is allowed. This is illustrated at step 450. Because the mark-up was removed, the first edit can be overwritten. If the second edit was not received, then process 400 ends.

Though FIG. 4 depicts maintaining/removing mark-ups based on age, edits can be marked-up based on any other factor. In some embodiments, edits can be marked-up based on users (e.g., privilege level, user roles, user names, etc.). In these embodiments, edits made by a particular user privilege level, user role, or user name can be marked-up with a corresponding color. In some embodiments, edits can be marked-up based on version history. For example, edits made in a first version can be marked-up using a first color, edits made in a second version can be marked-up using a second color, etc.

In some embodiments, the color or indicator (e.g., symbol, texture, etc.) of an edit can change based on the age of the edit. In embodiments, the tone, tint, or shade of an edit marked-up with a particular color can be altered based on the edit's age. For example, an edit that was entered recently may have a first tone, shade, and/or tint of a particular color at a first age, a second tone, shade, and/or tint of the particular color at a second age, etc. This can similarly be applied based on version history. For example, an edit that was entered in a first version can have a first tone, shade, and/or tint of a particular color and an edit entered in a second version can have a second tone, shade, and/or tint of the particular color.

In embodiments, notifications can be prompted based on mark-up status. For example, if an edit is marked-up and a user attempts to overwrite the marked-up edit, a notification can be prompted warning the subsequent editing user with relevant update data.

In some embodiments, the tone, shade, or tint of a color of an edit can dictate whether notifications are prompted and/or whether data overwrites are permitted. For example, overwrites can be prohibited while an edit has a first tone, shade, and/or tint, notifications can be prompted when an overwrite is attempted while the edit has a second tone, shade, and/or tint, and overwrites can be permitted while the edit has a third tone, shade, and/or tint.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
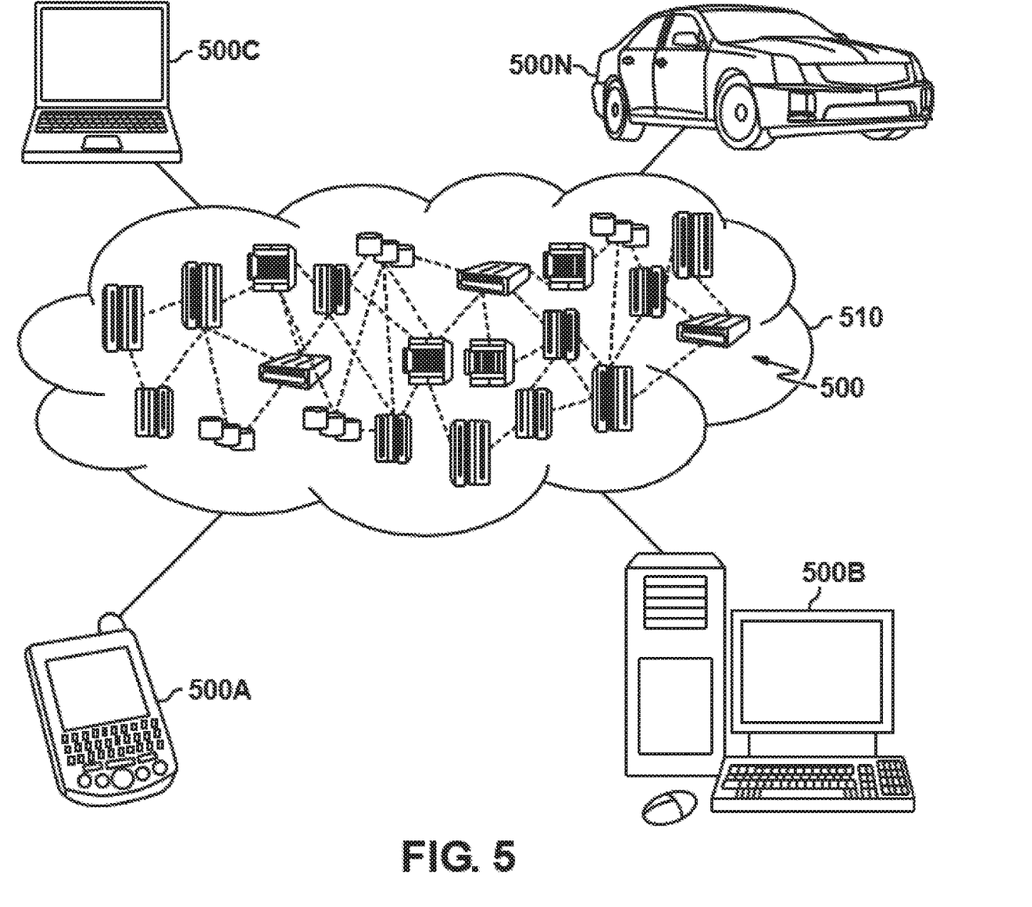
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A (e.g., client device 102, client device 112, server 122, computer system 701), desktop computer 500B (e.g., client device 102, client device 112, server 122, computer system 701) laptop computer 500C (e.g., client device 102, client device 112, server 122, computer system 701), and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
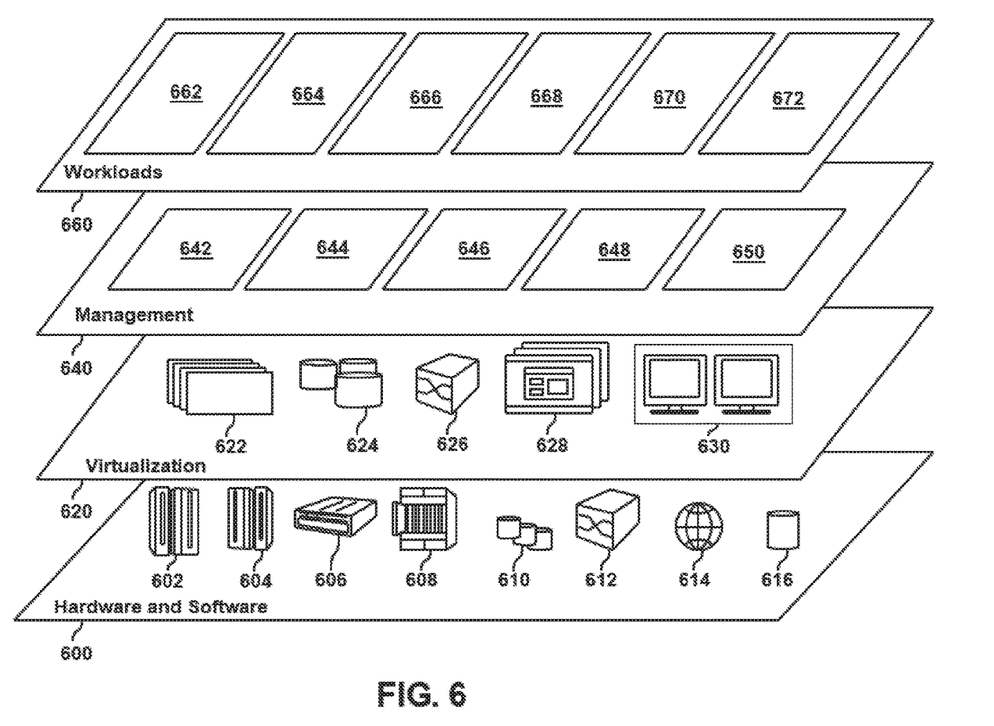
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 may allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and document collaboration management 672.

Figure 7:
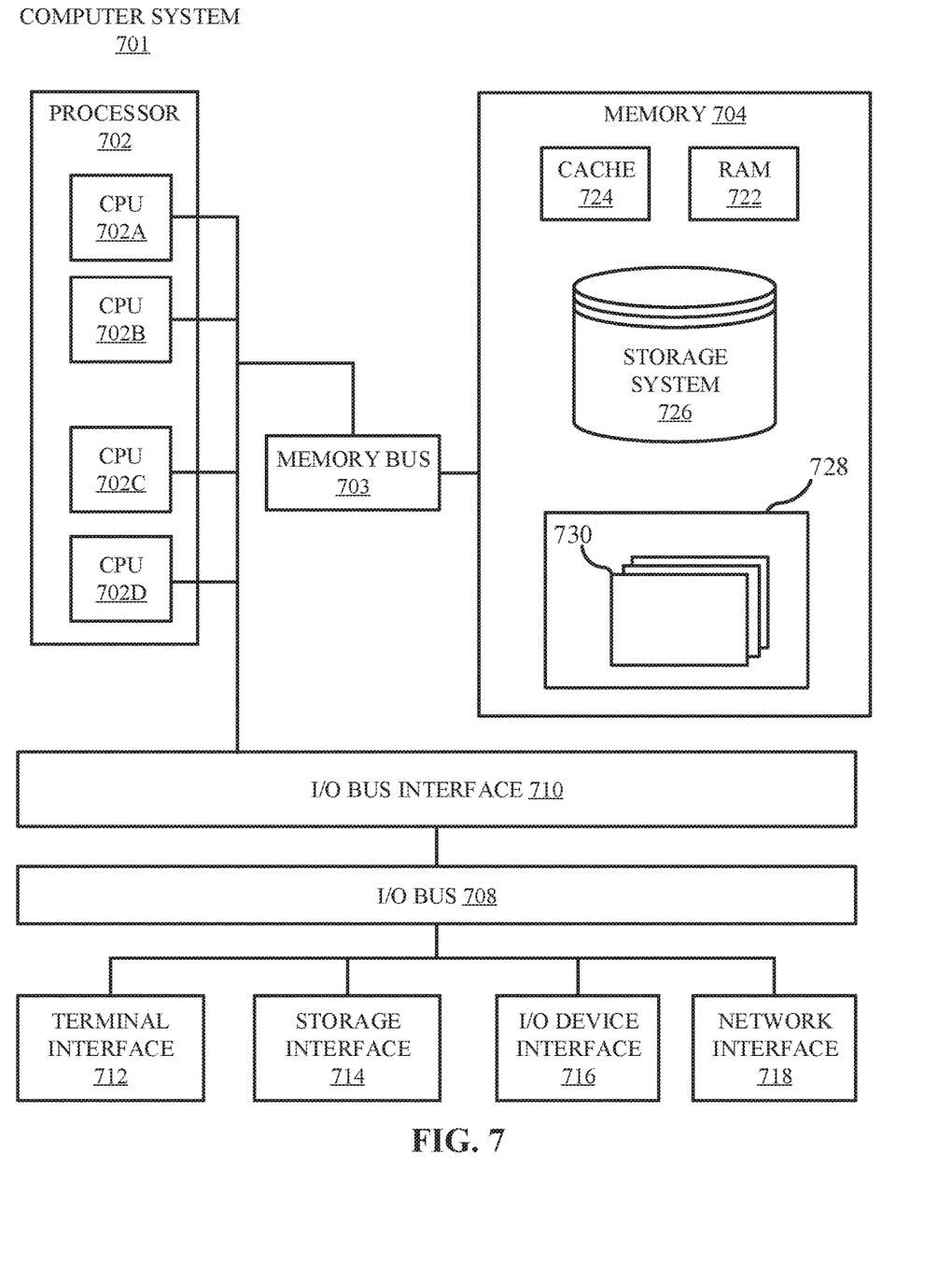
FIG. 7 is a high-level block diagram illustrating an example computer system that may be used in implementing one or more of the methods, tools, and modules, and any related functions, described herein, in accordance with embodiments of the present disclosure.

Referring now to FIG. 7, shown is a high-level block diagram of an example computer system 701 (e.g., client device 102, client device 112, server 122) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

In some embodiments, the program modules 730 of the computer system 701 may include a collaboration management module. The collaboration management module can be configured to set one or more editing rules which dictate overwrite permissions and/or notification prompting. The collaboration management module can be configured to determine whether one or more editing rules are violated. If one or more editing rules are violated, the collaboration management module can be configured to prevent subsequent edits and/or prompt notifications to users attempting to overwrite data.

The collaboration management module can also be configured to mark-up edits. The mark-ups can be used to inform subsequent editing users of recent changes. For example, the collaboration management module can be configured to mark-up edits based on age. In some embodiments, edits can be marked up based on users who entered edits and/or version history. In embodiments, the mark-up status can be used to prohibit subsequent edits and/or issue warnings to subsequent editing users.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for managing a collaborative environment, the method comprising:

configuring a set of editing rules for a shared spreadsheet, wherein the set of editing rules specify that edits made from users having a first user privilege level can be overwritten at a first age threshold and that edits made from users having a second user privilege level can be overwritten at a second age threshold, the second privilege level being lower than the first privilege level and the second age threshold being lower than the first age threshold;

receiving a first edit at a first time at a first cell of the shared spreadsheet from a first user having the first user privilege level;

marking up the first cell at the first time with a first texture based on the first user privilege level;

receiving a second edit at a second time at the first cell of the shared spreadsheet from a second user having the second user privilege level which attempts to overwrite a portion of the first edit;

determining an age of the first edit at the second time;

marking up the first edit with a second texture based on the age of the first edit at the second time;

transmitting a notification to the second user including the age of the first edit at the second time, a username for the first user who entered the first edit, and the first user privilege level of the first user who entered the first edit;

issuing, in response to determining that the age of the first edit at the second time is lower than the first age threshold, an alert action to the second user associated with the second edit;

blocking, in response to determining that the age of the first edit at the second time is lower than the first age threshold, the second edit;

receiving a third edit at a third time at a second cell of the shared spreadsheet from the second user;

marking up the third edit at the third time at the second cell of the shared spreadsheet with a first symbol based on the second user privilege level;
determining an age of the third edit at a fourth time;
marking up the third edit at the fourth time at the second cell of the shared spreadsheet with a second symbol based on the age of the third edit at the fourth time;
receiving a fourth edit at a fifth time at a third cell of the shared spreadsheet;
outlining the third cell of the shared spreadsheet with a first color;
determining an age of the fourth edit at a sixth time; and
altering a shade of the first color based on the age of the fourth edit at the sixth time.

2. The method of claim 1, further comprising:
receiving a request to override the blocking from the second user associated with the second edit; and
permitting the second edit in response to receiving the request to override the blocking, wherein permitting the second edit allows the second edit to overwrite the portion of the first edit at the first cell.

3. A computer program product comprising a computer readable storage medium having program instructions embodied therewith, wherein the computer readable storage medium does not comprise a transitory signal per se, the program instructions executable by a processor to cause the processor to perform a method comprising:
configuring a set of editing rules for a shared spreadsheet, wherein the set of editing rules specify that edits made from users having a first user privilege level can be overwritten at a first age threshold and that edits made from users having a second user privilege level can be overwritten at a second age threshold, the second privilege level being lower than the first privilege level and the second age threshold being lower than the first age threshold;
receiving a first edit at a first time at a first cell of the shared spreadsheet from a first user having the first user privilege level;
marking up the first cell at the first time with a first texture based on the first user privilege level;
receiving a second edit at a second time at the first cell of the shared spreadsheet from a second user having the second user privilege level which attempts to overwrite a portion of the first edit;
determining an age of the first edit at the second time;
marking up the first edit with a second texture based on the age of the first edit at the second time;
transmitting a notification to the second user including the age of the first edit at the second time, a username for the first user who entered the first edit, and the first user privilege level of the first user who entered the first edit;
prompting, in response to determining that the age of the first edit at the second time is lower than the first age threshold, a notification to the second user who transmitted the second edit warning the second user of the overwrite of the portion of the first edit;
blocking, in response to determining that the age of the first edit at the second time is lower than the first age threshold, the second edit;
receiving a third edit at a third time at a second cell of the shared spreadsheet from the second user;
marking up the third edit at the third time at the second cell of the shared spreadsheet with a first symbol based on the second user privilege level;
determining an age of the third edit at a fourth time;
marking up the third edit at the fourth time at the second cell of the shared spreadsheet with a second symbol based on the age of the third edit at the fourth time;
receiving a fourth edit at a fifth time at a third cell of the shared spreadsheet;
outlining the third cell of the shared spreadsheet with a first color;
determining an age of the fourth edit at a sixth time; and
altering a shade of the first color based on the age of the fourth edit at the sixth time.

4. The computer program product of claim 3, further comprising:
receiving a request to enter the second edit from the second user associated with the second edit after the transmitting; and
entering the second edit, wherein entering the second edit allows the second edit to overwrite the portion of the first edit at the first cell.

5. A system for managing a collaborative environment, the system comprising:
a memory storing program instructions; and
a processor, the processor configured to executing the program instructions to perform a method comprising:
configuring a set of editing rules for a shared spreadsheet, wherein the set of editing rules specify that edits made from users having a first user privilege level can be overwritten at a first age threshold and that edits made from users having a second user privilege level can be overwritten at a second age threshold, the second privilege level being lower than the first privilege level and the second age threshold being lower than the first age threshold;
receiving a first edit at a first time at a first cell of the shared spreadsheet from a first user having the first user privilege level;
marking up the first cell at the first time with a first texture based on the first user privilege level;
receiving a second edit at a second time at the first cell of the shared spreadsheet from a second user which attempts to overwrite a portion of the first edit;
determining an age of the first edit at the second time;
marking up the first edit with a second texture based on the age of the first edit at the second time;
transmitting a notification to the second user including the age of the first edit at the second time, a username for the first user who entered the first edit, and the first user privilege level of the first user who entered the first edit;
blocking, in response to determining that the age of the first edit at the second time is lower than the first age threshold, the second edit;
receiving a third edit at a third time at a second cell of the shared spreadsheet from the second user;
marking up the third edit at the third time at the second cell of the shared spreadsheet with a first symbol based on the second user privilege level;
determining an age of the third edit at a fourth time;
marking up the third edit at the fourth time at the second cell of the shared spreadsheet with a second symbol based on the age of the third edit at the fourth time;
receiving a fourth edit at a fourth time at a third cell of the shared spreadsheet;
outlining the third cell of the shared spreadsheet with a first color;
determining an age of the fourth edit at a fifth time; and
altering a shade of the first color based on the age of the fourth edit at the fifth time.

6. The system of claim 5, further comprising:
receiving a request to override the blocking from the second user associated with the second edit; and
permitting the second edit in response to receiving the request to override the blocking, wherein permitting the second edit allows the second edit to overwrite the portion of the first edit at the first cell.

\* \* \* \* \*